US011924088B2

(12) United States Patent
Lu et al.

(10) Patent No.: US 11,924,088 B2
(45) Date of Patent: Mar. 5, 2024

(54) PACKET ROUTING WITH REDUNDANT NETWORK DEVICES

(71) Applicant: MICROSOFT TECHNOLOGY LICENSING, LLC, Redmond, WA (US)

(72) Inventors: Guohan Lu, Redmond, WA (US); Lihua Yuan, Redmond, WA (US); Prince Sunny, Redmond, WA (US); Tamer Ahmed, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 139 days.

(21) Appl. No.: 17/476,402

(22) Filed: Sep. 15, 2021

(65) Prior Publication Data
US 2023/0080702 A1 Mar. 16, 2023

(51) Int. Cl.
*H04L 45/24* (2022.01)
*H04L 12/46* (2006.01)
(Continued)

(52) U.S. Cl.
CPC .......... *H04L 45/24* (2013.01); *H04L 12/4633* (2013.01); *H04L 45/02* (2013.01); *H04L 45/42* (2013.01); *H04L 45/566* (2013.01)

(58) Field of Classification Search
CPC ..... H04L 45/24; H04L 12/4633; H04L 45/02; H04L 45/42; H04L 45/566
See application file for complete search history.

(56) References Cited

U.S. PATENT DOCUMENTS 10,432,420 B2 * 10/2019 Warade ................ H04L 45/48
2004/0010601 A1 * 1/2004 Afergan .............. H04L 67/1001
709/229

(Continued)

OTHER PUBLICATIONS

"International Search Report and Written Opinion Issued in PCT Application No. PCT/US22/041134", dated Nov. 24, 2022, 14 Pages.

(Continued)

*Primary Examiner* — Chris Parry
*Assistant Examiner* — Dixon F Dabipi
(74) *Attorney, Agent, or Firm* — Han Gim; Newport IP, LLC

(57) ABSTRACT

An environment includes at least two network devices and a plurality of downstream devices or networks. The downstream devices or networks are communicatively coupled to network interfaces of the network devices using a plurality of data cables. The data cables each comprise a switch device configured to switch communication paths to the coupled network devices. Each of the data cables communicatively couple each of the network devices to one of the plurality of downstream devices or networks so that each of the downstream devices or networks has a communications path to each of the network devices and a switchable communications path from each of the network devices. The network devices do not arbitrate active/passive status via direct communication. Based on data contained in a reply packet indicating that a request packet sent by the first network device was acknowledged, the first network device determines that the first network device is an active network device.

20 Claims, 10 Drawing Sheets

(51) Int. Cl.
    *H04L 45/00*    (2022.01)
    *H04L 45/02*    (2022.01)
    *H04L 45/42*    (2022.01)

(56) References Cited

U.S. PATENT DOCUMENTS

2019/0245949 A1* 8/2019 Wang .................. H04L 41/0895
2020/0036632 A1* 1/2020 Kommula ............ G06F 9/45558
2020/0186460 A1* 6/2020 Power ..................... H04L 45/22

OTHER PUBLICATIONS

"GPRC", Retrieved from: https://web.archive.org/web/20210825053543/https://grpc.io/, Aug. 25, 2021, 2 Pages.

"Improved support for p2p tunnels", Retrieved from: https://github.com/opencomputeproject/SAI/commit/4e42a023eebd76dd178cba145a639a2763659a6c, Retrieved Date: Apr. 23, 2021, 5 Pages.

Adolfsson, Daniel, "ndppd—NDP Proxy Daemon", Retrieved from: https://manpages.debian.org/buster/ndppd/ndppd.1.en.html, Sep. 18, 2011, 2 Pages.

Lytvynov, et al., "gNMI—gRPC Network Management Interface", Retrieved from: https://github.com/openconfig/gnmi, Jul. 7, 2021, 2 Pages.

Siuda, et al., "Add support for IP FRR", Retrieved from: https://github.com/opencomputeproject/SAI/commit/7f5bec3c9207025e9c260b598e5c91b5c37f48c1, Jul. 14, 2017, 5 Pages.

"Application Filed in U.S. Appl. No. 16/835,210", Filed Date: Mar. 30, 2020, 44 Pages.

* cited by examiner

PACKET ROUTING WITH REDUNDANT NETWORK DEVICES

BACKGROUND

A data center is a facility that houses computer systems and various networking, storage, and other related components. Data centers may, for example, provide computing services to businesses and individuals as a remote computing service or provide "software as a service" (e.g., cloud computing).

A data center may house hundreds or thousands of servers. Each server may host a number of virtual machines and other resources. It is important to prevent downtime due to hardware and network failures and other issues that may prevent the operation of services provided by the data center. Some data centers may implement ways to provide some resiliency to failures that might prevent a loss of network communications. Such resiliency may exist from Tier-1 networking elements to the higher tier networking elements. However, since each individual server typically only uses a single connection to the first network element, referred to as a Tier-0 element (e.g., Top of Rack (ToR) device), there may be a single point of failure for downstream devices and networks. For example, such as failure may isolate a server or an entire rack of servers from the network.

When a data center experiences server connectivity issues, loss of data and services may result, preventing users from providing quality services to their downstream customers, which may result in lost revenue and customer dissatisfaction. Production loss and inefficiencies with respect to computing resources can be exacerbated when the data center is unable to quickly isolate and correct the cause of a connection failure. Additionally, scheduled maintenance and replacement of a Tier-0 device may require that the servers connected to that Tier-0 device lose connectivity while the Tier-0 device is being replaced or serviced. Many service agreements require that customers are provided with advance notice, thus precluding the possibility of scheduling maintenance as needed by the service provider without providing notice, or precluding the possibility of replacing the Tier-0 device on the spot.

It is with respect to these considerations and others that the disclosure made herein is presented.

SUMMARY

The disclosed embodiments describe technologies for providing redundant data paths for devices and networks connected to a network device such as a Tier-0 device to help prevent the devices and networks from becoming isolated, for example from the data plane network or the main control plane network when the network device or connections to the network device are lost. The technologies may be implemented in conjunction with servers and other devices or networks that require network resiliency.

Some resiliency schemes may be not efficient for Tier-0 network environments. For example, network interface card (NIC) teaming and multi-chassis link aggregation may be used to provide redundant interfaces into the network. However, such a scheme may be difficult to implement for cloud-scale hosted virtual machine services because some applications and devices may not be designed to recognize two network interfaces. Additionally, there may be issues with a possible loss of traffic forwarding capability that may be difficult to prevent and debug. While it may be possible to connect servers to two different Tier-0 network elements through diversely routed facilities (e.g., optical or copper cables), providing a second NIC to each server may be costly. It may also be possible to duplicate the network devices using a switch or multiplexer. However, this would require changes to the network device interfaces that may undermine compatibility between devices in a data center, as well as require the expense of custom switches or multiplexers that can greatly increase the cost of deploying such a solution across a data center or across multiple data centers.

The disclosed embodiments describe a way to respond to a failure of a network device or failed network facilities (e.g., cabling) and enable data traffic flows through the network so that normal data link availability may be quickly restored while avoiding significant impacts to customers. In an embodiment, an N-way redundant switching cable may be implemented that provides N-way redundancy and operates with N-way redundant network devices (e.g., ToRs) while lowering the cost of selecting and switching between the redundant network devices. For example, an active direct attach cable (DAC) assembly may be used to switch between redundant ToRs. One end of the cable may provide a standard NIC connector (e.g., QSFP28 or other) while the other end of the cable may have an active multiplexer/switch that selects the active (primary) ToR. The cable multiplexer/switch can be commanded to switch between ToRs through, for example, a data bus or signal wire. Alternatively, a protocol such as Bidirectional Forwarding Detection (BFD) protocol can be used to detect a fault and determine whether to switch between ToRs.

On the ToR side, each redundant ToR may receive the same data from each connected downstream device (e.g., server) but only one (active or primary) ToR transmits data towards the host on the connected servers. In various embodiments, a way to implement active/passive ToRs without external changes to the ToRs is disclosed, thus reducing costs that would otherwise be required if the ToR were to be modified. Furthermore, the ToRs need not communicate with one another to arbitrate which one is primary and which ones are the backups.

In some embodiments, the properties and utilities of network protocols such as Ethernet protocols may be used to enable network devices such as ToRs to detect their active/primary status and act accordingly. In an embodiment, redundant ToRs will have the same VLAN configuration as well as virtual MAC address. The redundant ToRs will advertise the VLAN prefix to the host. One of the ToR ports will be active mode, and the remaining ToR ports will be standby mode.

For the active port, the cable multiplexer/switch may forward data traffic downstream to the server or other connected devices. For the standby port, the cable multiplexer/switch will not forward the traffic down to the server or other connected devices. The ToRs may drop all the traffic received on the standby port. The ToRs may use L3 tunneling to forward all traffic destined to the standby port on the peer TOR. All upstream traffic is broadcast to active and standby ToRs. The ToRs may inspect the returned packets to determine the destination ToR, thus indicating which ToR was the active ToR.

Among many other benefits, the techniques shown herein improve efficiencies with respect to a wide range of computing resources. For instance, data centers may avoid or reduce the number of server connectivity issues and the resulting loss of data and services. Additionally, scheduled maintenance and replacement of Tier-0 devices may be performed without losing connectivity to the servers connected to that Tier-0 device. Additionally, data centers can perform such services without the requirement to provide advance notice to customers, thus providing greater efficiencies in scheduling maintenance or performing maintenance in quick response to incidents. Other technical effects, other than those mentioned herein, can also be realized from implementations of the technologies disclosed herein.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
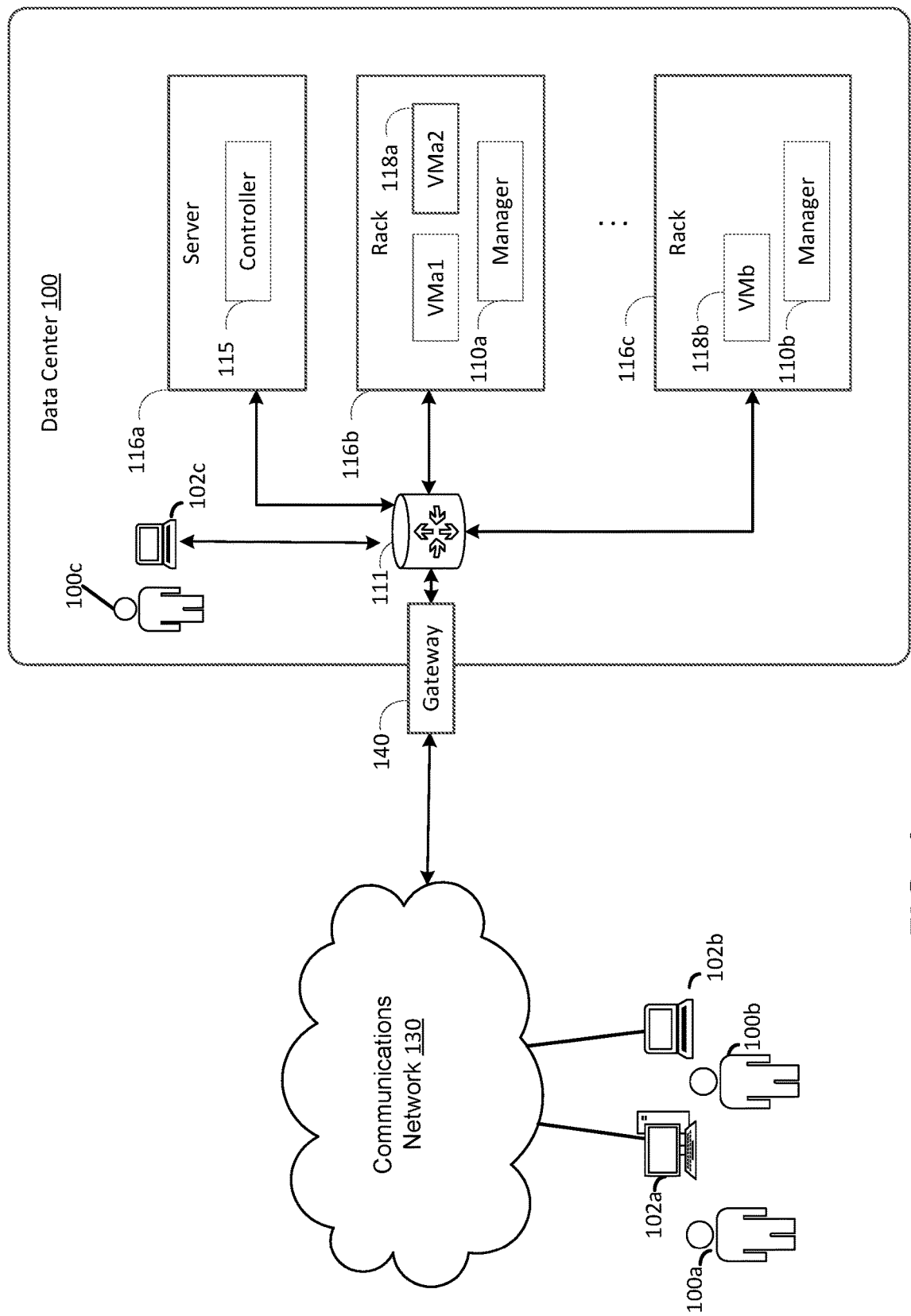
FIG. 1 is a diagram illustrating a data center for providing computing resources in accordance with the present disclosure.

The disclosed embodiments describe technologies for providing redundant network paths to prevent devices and networks from becoming isolated from the main data and/or control network. In an embodiment, a multiplexer or switch device may be integrated with a cable, such as a DAC cable, which may be referred to herein as a redundant cable. An example of such a cable is described in U.S. application Ser. No. 16/835,210 entitled "Smart Cable for Redundant ToR's" filed on 30 Mar. 2020, the entire contents of which are incorporated herein by reference. The multiplexer or switch device may be referred to herein as a switch device. In some embodiments, the redundant cable may provide a cross-point switch capability that can switch traffic at OSI model Layer 1 (physical layer) between redundant Tier-0 devices, which in many examples herein can be a Top of Rack (ToR) device. A server of a group of servers, another network device, or any other computing or network device may be connected to the redundant cable. In other examples, the redundant cable may provide a cross-point switch capability that can switch traffic between other types of redundant network devices.

In one embodiment, the redundant cable may interconnect a device such as a server to redundant ToRs. Multiple redundant cables may be used to connect each device to the redundant ToRs. The redundant cable may be interchangeable. In one embodiment, the redundant cable may be configured to broadcast data traffic from a device (e.g., server) to a first ToR and a second ToR and additional ToRs if implemented. The redundant cable may further be configured to switch incoming data traffic from a first ToR to a second ToR (or additional ToRs), for example if the first ToR has failed or needs to be serviced. In an example implementation, circuitry to implement this switching capability may be embedded in a Quad Small Form-factor Pluggable (QSFP)-based DAC cable. The circuitry may be configured to switch data traffic from one ToR device to other ToR devices.

The disclosure provides a methodology to indicate to the ToRs which of the redundant ToRs should be primary, without the necessity for the ToRs to be configured to use a control signal, or to communicate between the ToR to the NIC such as using ON/OFF of the link, or using BFD between the ToR and the NIC.

In some implementations, the switch device in the redundant cable may be configured to make the decision to switch between ToRs. In one embodiment, the switch device may be accompanied by a microcontroller unit (MCU) device configured to control various aspects of auto-negotiation and link training. The MCU device may execute code that is modifiable. Interactions with the switch device state can be used to determine if a link is up/down or in some other intermediate state. The presence of a fully trained link may be interpreted as the link being in an UP state and hence may be used to allow the switch device to determine which link will be used based on a flexible and programmable model. In some embodiments, the switch device with MCU may be configured to work in conjunction with other mechanisms deployed by the NIC or ToR.

In various embodiments disclosed herein, the detection of active and standby status of the ToRs can be greatly simplified to avoid the ToRs having to communicate with one another to negotiate which will be active or standby. One problem with using redundant devices is that more than one of the redundant devices may believe that they are the active device and act as the active device. Alternatively, all of the redundant devices may believe that another device is the active device, and act as the standby device, in which case severe data communications problems may result. The disclosed techniques allow for maintaining network connectivity to a downstream device if its connection to the ToR fails or if one of the ToRs is serviced/replaced, without the need for coordination between ToRs, while avoiding the possibility of the ToRs incorrectly acting as active or standby devices.

The network may use a utility for discovery and pinging lower layer devices on the network, such as ICMP ECHO Request/Reply and ARPing. For example, Ping packets may be transmitted on the link to probe devices using Address Resolution Protocol (ARP). The pinged information may allow for the association of the MAC address of the host and the receiving MAC address for the active ToR. This allows hosts to be resolved by their MAC addresses, and the redundant ToRs can determine, based on the pinged information, whether they are an active or passive ToR.

In some of the example embodiments described herein, the following assumptions are considered:

The redundant cable hardware filters downstream traffic from all non-active upstream ports.

The redundant cable hardware broadcasts upstream traffic to all upstream ports.

All ToRs advertise themselves to upstream T1 links as having routes to the server.

In an embodiment, the redundant ToRs will have the same VLAN configuration as well as virtual MAC address. The redundant ToRs advertise VLAN the prefix to T1 links. One of the redundant ToR ports will be active mode, all other ToR ports will be standby mode.

For the active ToR port, the redundant cable may forward the traffic downstream to the connected devices (e.g., server). For the standby port(s), the redundant cable does not forward the traffic down to the server as the switching device in the redundant cable is only connected to the active ToR. The ToRs will drop most of the traffic received on the standby port. In an embodiment, the ToRs may use an L3 tunnel to forward all traffic destined to the standby port to the peer ToRs.

The following provides an example for how a ToR detects if it is the active ToR:

Each ToR sends a packet (e.g., ping/echo request) to the downstream device via the redundant cable, including its unique ID in the data For downstream traffic, the redundant cable blocks all of the requests, except those from the active ToR The downstream device (e.g., server) receives a request from only the active ToR (data includes that active ToR's ID)

The downstream device (e.g., server) responds to the request (e.g., Echo reply); the data includes indication of the active ToR's ID For upstream traffic, the redundant cable broadcasts the response packet to all ToRs Each ToR receives the response data (e.g., Echo reply)

Each ToR determines if the included ID matches its own ID

When a ToR determines that is has transitioned from an active ToR to a backup ToR:

The ToR creates access control lists (ACLs) to block general upstream traffic from that port (allowing traffic for active detection), thus preventing duplicate transmissions at the T1 level.

The ToR tunnels downstream packets destined for that port to the active ToR

When a ToR detects that it has transitioned from backup ToR to active ToR:

The ToR disables the ACLs that block general upstream traffic (since it must forward packets to T1)

The ToR decapsulates tunneled packets received from backup TORs, and sends those packets downstream via the redundant cable While ACLs may be used to block certain traffic, other methods may be used to prevent sending of duplicate packets.

When detecting the active TOR, in an embodiment the unique ID need only be unique relative to the redundant cable. The ID may be retrieved from the cable (e.g., out-of-band via I2C), or it may re-use an existing unique ID such as the interface's MAC address, a dynamically generated GUID, an assigned UUID, a cryptographically random value of sufficient length, or the like. In some embodiments, downstream devices may obtain from the redundant cable an index as to which of the cable outputs that they are connected to. Additionally, a ToR can send a query to the redundant cable as to cable output is currently active, thus indicating which ToR is active. Such queries may be communicated using the disclosed out-of-band interfaces, if present.

In an embodiment, using Ping, the ID may be stored in one or more of the bits associated with the identifier, sequence, or payload fields. While Ping is used as an example, any protocol with source-provided data in the request, where the response data provides a means to determine if the source-provided data matches, may be implemented. For example, if the response performs a reversible mapping of values, such as "rotate left" of the bits, the protocol can still be used to detect the active ToR.

The disclosed techniques enable the ToR that is the active ToR to provide an accurate active/standby status of the ToRs when used in conjunction with the described redundant cable. By using the described redundant cable with the ToR status detection techniques, from the downstream device perspective, only a single link to a single ToR is observed because data is sent to the redundant cable which switches between the redundant ToRs. No changes are thus required on the downstream side. A switchover of active/standby ToRs at any given downstream device may not affect other downstream devices. In some embodiments, a plurality of downstream devices may have different primary and backup ToRs.

Additionally, the disclosed embodiments may be implemented at a finer level of granularity than an entire ToR. For example, a given port on a ToR may be active or passive with respect to a first topology, and another port on the ToR may be active or passive with respect to a second topology.

It should be understood that the methods described herein can be extended to two or more network devices such as ToRs. The described examples are illustrated using two ToRs for simplicity; however, the techniques may be extended to two or more ToRs (or other network devices) in various implementations. It should also be understood that the described techniques may be used using connectors other than QSFP connectors.

FIG. 1 illustrates an example computing environment in which the embodiments described herein may be implemented. FIG. 1 illustrates a data center 100 that configured to provide computing resources to users 100a, 100b, or 100c (which may be referred herein singularly as "a user 100" or in the plural as "the users 100") via user computers 102a, 102b, and 102c (which may be referred herein singularly as "a computer 102" or in the plural as "the computers 102") via a communications network 130. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include servers 116a, 116b, and 116c (which may be referred to herein singularly as "a server 116" or in the plural as "the servers 116") that provide computing resources available as virtual machines 118a and 118b (which may be referred to herein singularly as "a virtual machine 118" or in the plural as "the virtual machines 118"). The virtual machines 118 may be configured to execute applications such as Web servers, application servers, media servers, database servers, and the like. Other resources that may be provided include data storage resources (not shown on FIG. 1) and may include file storage devices, block storage devices, and the like. Servers 116 may also execute functions that manage and control allocation of resources in the data center, such as a controller 115. Controller 115 may be a fabric controller or another type of program configured to manage the allocation of virtual machines on servers 116.

Referring to FIG. 1, communications network 130 may, for example, be a publicly accessible network of linked networks and may be operated by various entities, such as the Internet. In other embodiments, communications network 130 may be a private network, such as a corporate network that is wholly or partially inaccessible to the public.

Communications network 130 may provide access to computers 102. Computers 102 may be computers utilized by users 100. Computer 102a, 102b or 102c may be a server, a desktop or laptop personal computer, a tablet computer, a smartphone, a set-top box, or any other computing device capable of accessing data center 100. User computer 102a or 102b may connect directly to the Internet (e.g., via a cable modem). User computer 102c may be internal to the data center 100 and may connect directly to the resources in the data center 100 via internal networks. Although only three user computers 102a, 102b, and 102c are depicted, it should be appreciated that there may be multiple user computers.

Computers 102 may also be utilized to configure aspects of the computing resources provided by data center 100. For example, data center 100 may provide a Web interface through which aspects of its operation may be configured through the use of a Web browser application program executing on user computer 102. Alternatively, a stand-alone application program executing on user computer 102 may be used to access an application programming interface (API) exposed by data center 100 for performing the configuration operations.

Servers 116 may be configured to provide the computing resources described above. One or more of the servers 116 may be configured to execute a manager 110a or 110b (which may be referred herein singularly as "a manager 110" or in the plural as "the managers 110") configured to execute the virtual machines. The managers 110 may be a virtual machine monitor (VMM), fabric controller, or another type of program configured to enable the execution of virtual machines 118 on servers 116, for example.

It should be appreciated that although the embodiments disclosed above are discussed in the context of virtual machines, other types of implementations can be utilized with the concepts and technologies disclosed herein. For example, the embodiments disclosed herein might also be utilized with computing systems that do not utilize virtual machines.

In the example data center 100 shown in FIG. 1, a router 111 may be utilized to interconnect the servers 116a and 116b. Router 111 may also be connected to gateway 140, which is connected to communications network 130. Router 111 may manage communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 100 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, tablets, and various other devices that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2A:
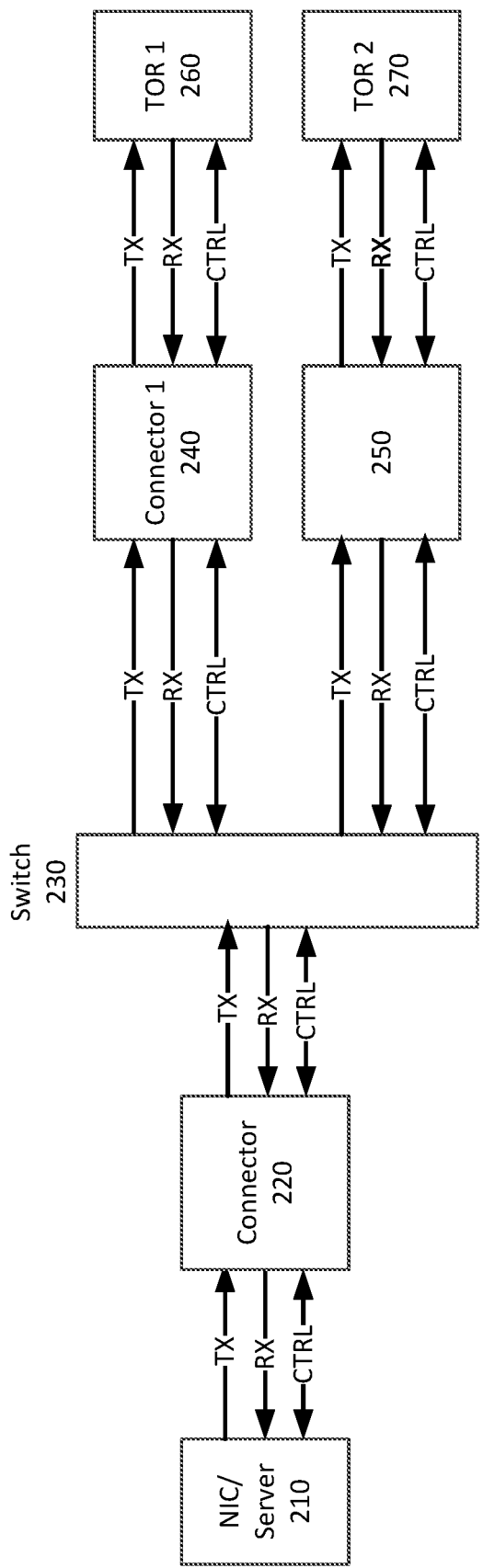
FIG. 2A is an example resilient network topology in accordance with the present disclosure.

FIG. 2A illustrates an example topology of a network implementing an example dual cable. In one embodiment, a dual cable may have 4 TX, 4 RX, and one or more control lines. For example, the control lines may include a Clock and a I2C line. FIG. 2A illustrates a resilient network topology with switching implemented at the QSFP cable. Illustrated are two Tier-0 ToR network elements 260 and 270. Switching chip 230 may be implemented in the dual cable that implements Layer-1 switching within the cable. One of dual ToRs 260 and 270 are connected to server 210 based on the switching.

In some embodiments, control and status signaling may be implemented to indicate an active communication path corresponding to one of two ToRs. In some embodiments, the control and status signaling may be implemented as an in-band signal. In other embodiments, out of band control and status signaling may be implemented using existing conductors in the dual cable.

In one embodiment, the control and status signal can be a 2-level active/standby signal or a serial bus with multi-master capability. Changes in the active/standby state can be driven by either ToR. In some embodiments, the secondary or slave ToR may initiate a switch if the primary ToR fails to generate heartbeat messages for a predetermined threshold.

Figure 2B:
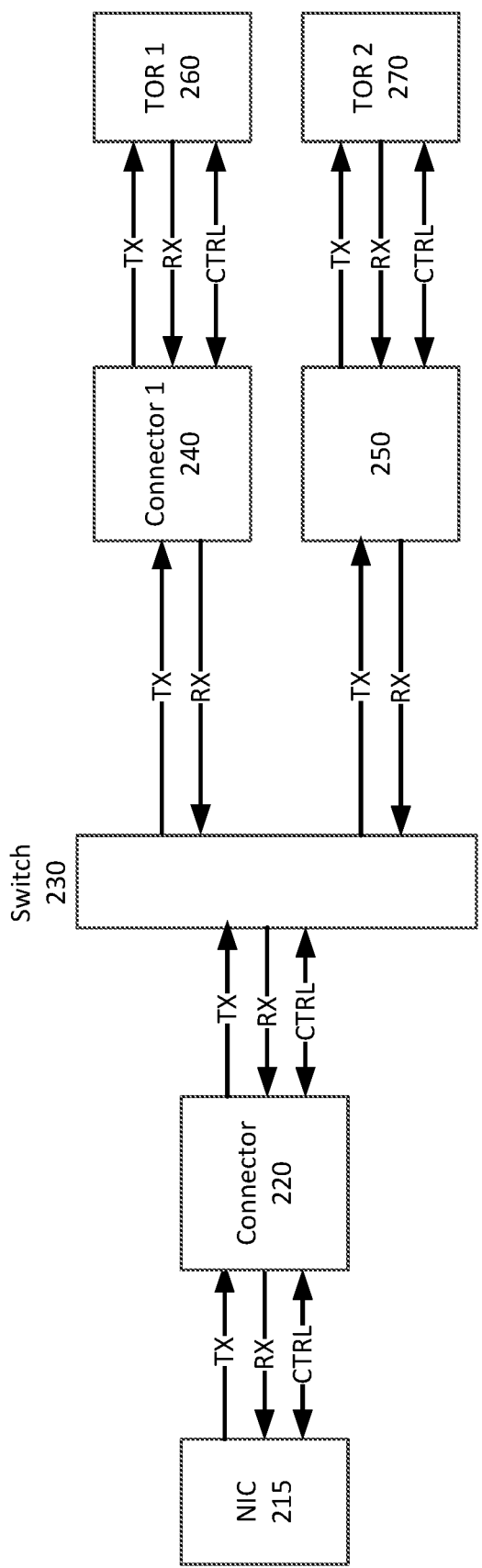
FIG. 2B is an example resilient network topology in accordance with the present disclosure.

FIG. 2B illustrates another example topology of a network implementing a dual cable. In an embodiment, a dual cable may have 4 TX and 4 RX, but does not provide control lines from the ToRs. In this example, the NIC 215 may determine whether to control the switch device 230 to switch between ToRs 260 or 270 based on the presence or absence of a BFD heartbeat for a predetermined threshold, which indicates whether the currently active ToR is communicating properly.

Figure 2C:
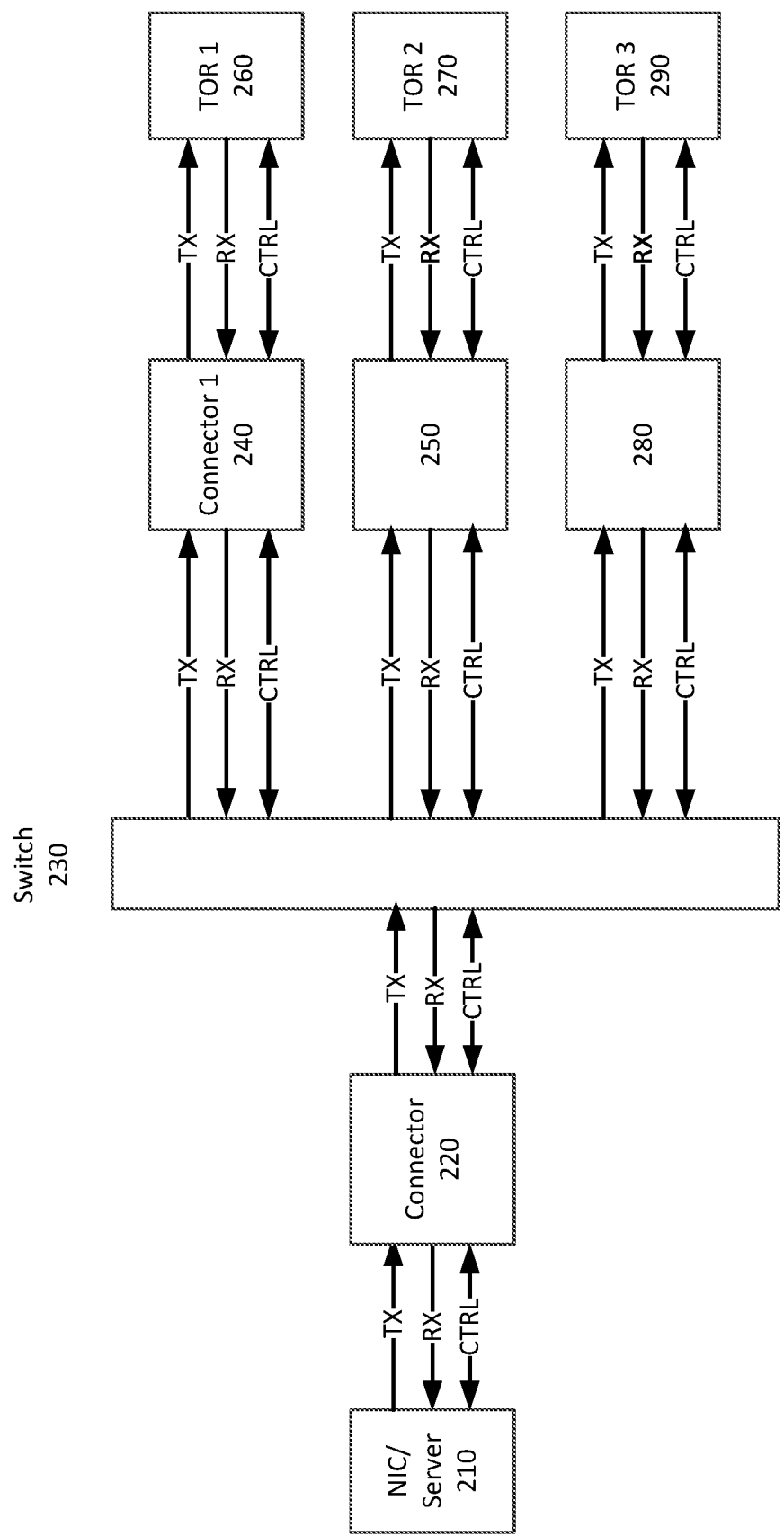
FIG. 2C is an example resilient network topology in accordance with the present disclosure.

FIG. 2C illustrates an example topology of a network implementing an example triple redundant cable. In one embodiment, a triple redundant cable may have 4 TX, 4 RX, and one or more control lines. For example, the control lines may include a Clock and a I2C line. FIG. 2C illustrates a resilient network topology with switching implemented at the QSFP cable. Illustrated are three Tier-0 ToR network elements 280 and 290. Switching chip 230 may be implemented in the dual cable that implements Layer-1 switching within the cable. One of dual ToRs 280 and 290 are connected to server 210 based on the switching.

Figure 3A:
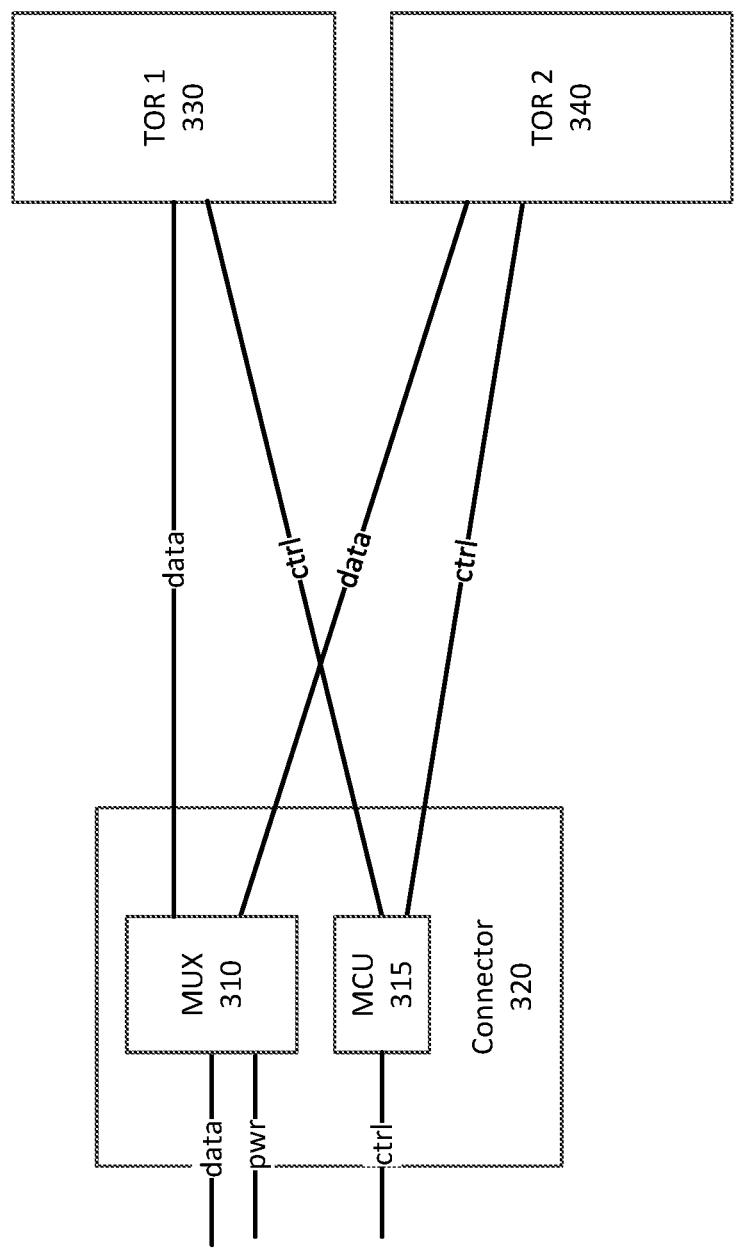
FIG. 3A is an example resilient network topology in accordance with the present disclosure.

FIG. 3A illustrates an example redundant switching mechanism as disclosed herein. In this example, a dual cable with connector 320 may be connected to diverse network interfaces at ToR1 330 and ToR2 340. As shown in FIG. 3A, ToR1 330 and ToR2 340 need not be directly communicatively coupled. Connector 320 may be connected to the server-side interface and receive data, control, and optionally power. A switch 340 is controllable via a control signal to select one of the network interfaces.

In various embodiment, the disclosed processes may be executed to identify which ToR is the active device and which ToR is the standby device. The active and standby roles may determine whether the server side will receive data from ToR1 330 or ToR2 340. The functionality for determining the active ToR may be implemented based on the disclosed techniques using functionality implemented in the ToRs. The servers and their associated network interface devices such as the NIC thus do not require new functionality.

In an embodiment, the same data may be transmitted to both ToRs from the network. The MUX mechanism 310 and controller 315 in the connector 320 may be configured to switch between the ToRs. In some embodiments, the MUX mechanism 310 and controller 315 may select which ToR is active if an error or some type of inconsistency is detected, for example if the connection to one of the ToRs is faulty. When the ToR is switched, the Border Gateway Protocol (BGP) status of the TORs may be updated.

In some embodiments, the switching mechanism may be implemented as a device such as a chip that includes multiplexing capability. In one example, a SERDES based multiplexer may be implemented that is configured to select a primary ToR. In one example, the multiplexer can be configured to provide 8 individual TX/RX lanes on a first side, and 8 individual TX/RX lanes on a second side.

Figure 3B:
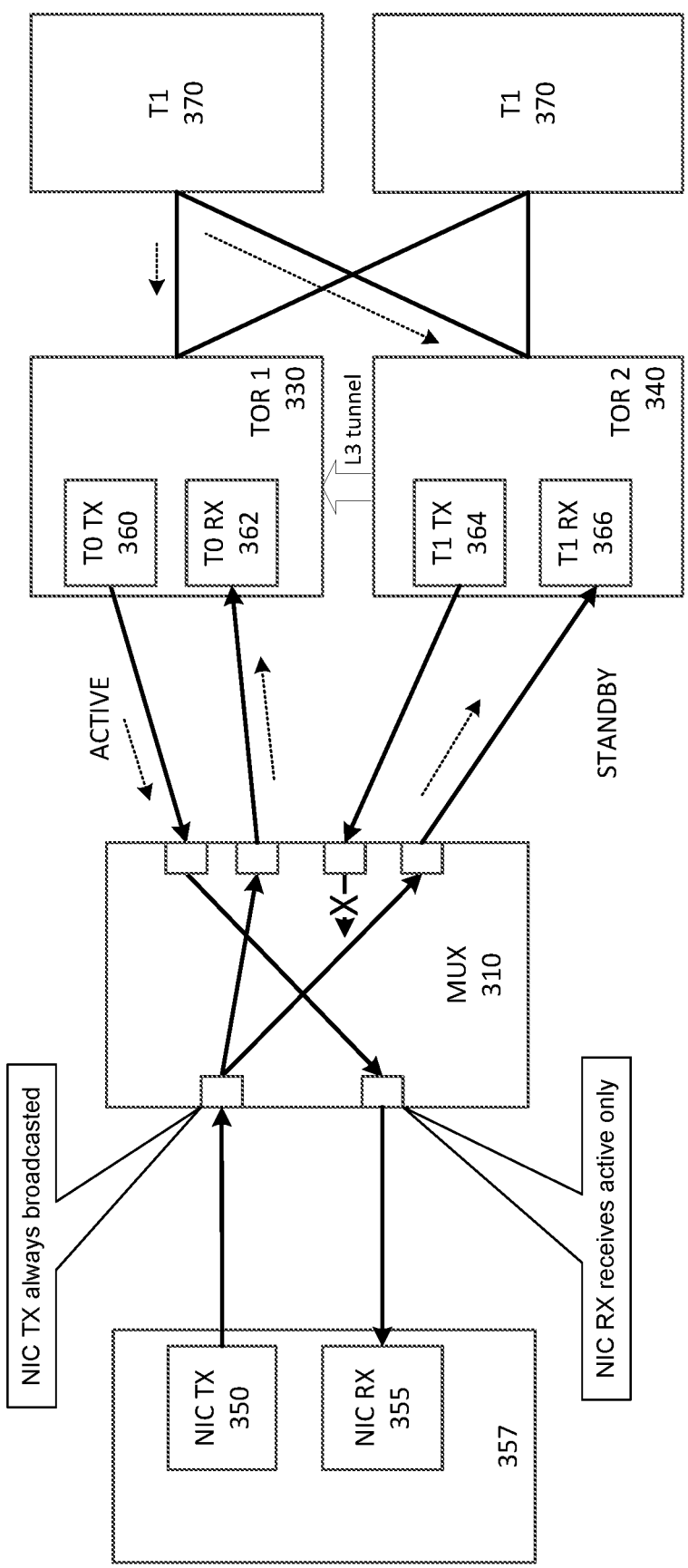
FIG. 3B is an example resilient network topology in accordance with the present disclosure.

FIG. 3B illustrates an example MUX 310 that may be connected to diverse network interfaces at ToR1 330 and ToR2 340. As shown in FIG. 3A, ToR1 310 has a transmit interface 360 and receive interface 362, and ToR2 320 has a transmit interface 364 and receive interface 466. MUX 310 may be connected to the server-side interface 357 via NIC TX 359 and NIC RX 355.

In an embodiment, the same data may be transmitted to both ToRs from the network from NIC TX 350. NIC RX 355 only receives data from the active ToR. In an embodiment, a function for discovery and pinging network devices such as ICMP ECHO Request/Reply or ARPing may be used to identify the active ToR. For example, ping packets may be transmitted to probe hosts using ICMP ECHO Request/Reply or Address Resolution Protocol (ARP). The pinged information allows for the association of the MAC address of the host and the receiving MAC address for the active ToR. This allows hosts to be resolved by MAC addresses, and both ToRs can determine, based on the pinged information, whether they are an active or passive ToR. Thus, only traffic originating from the active ToR will be forwarded to NIC RX 355. Upstream T1 links 370 may send data packets to either ToR. The backup ToR may forward packets to the active ToR using an L3 tunnel.

For example, both ToRs may send an ICMP ECHO request to the server. Only the ICMP ECHO request from the active ToR is received by the server since the MUX is only allowing traffic from the active ToR. An ICMP ECHO reply may be sent by the server to the active ToR that identifies its MAC address, thus permitting packets with the correct destination MAC address to be forwarded on the network. The standby ToR still receives the ICMP ECHO reply since the MUX broadcasts to both ToRs, but the standby ToR can determine based on the ICMP ECHO reply packet being addressed to the active ToR that it is not the active ToR. Going forward, packets with the incorrect destination MAC address can be dropped. Because each ToR can see the ICMP ECHO response packet and independently determine which is the active ToR, there is little or no performance loss.

Other protocols may be used to allow the active ToR to be identified or otherwise provide communications to the server. For example, BGP may be used in some embodiments to allow the active ToR to forward traffic to the server. For example, if the standby ToR receives any packets that are addressed to the server, the standby ToR recognizes that it is the standby ToR, encapsulates the packet and forwards the packet to the active ToR. The active ToR receives the encapsulated packet, identifies that it should be forwarded to the server, decapsulates the packet, and forwards the packet to the server via its active link.

For topologies with great than two ToRs, additional tunnels may be established as needed for the ToRs to forward packets. Additionally, the T1 nodes may be interconnected to multiple ToRs to enable packets to be distributed to the ToRs as needed for load balancing.

Figure 4:
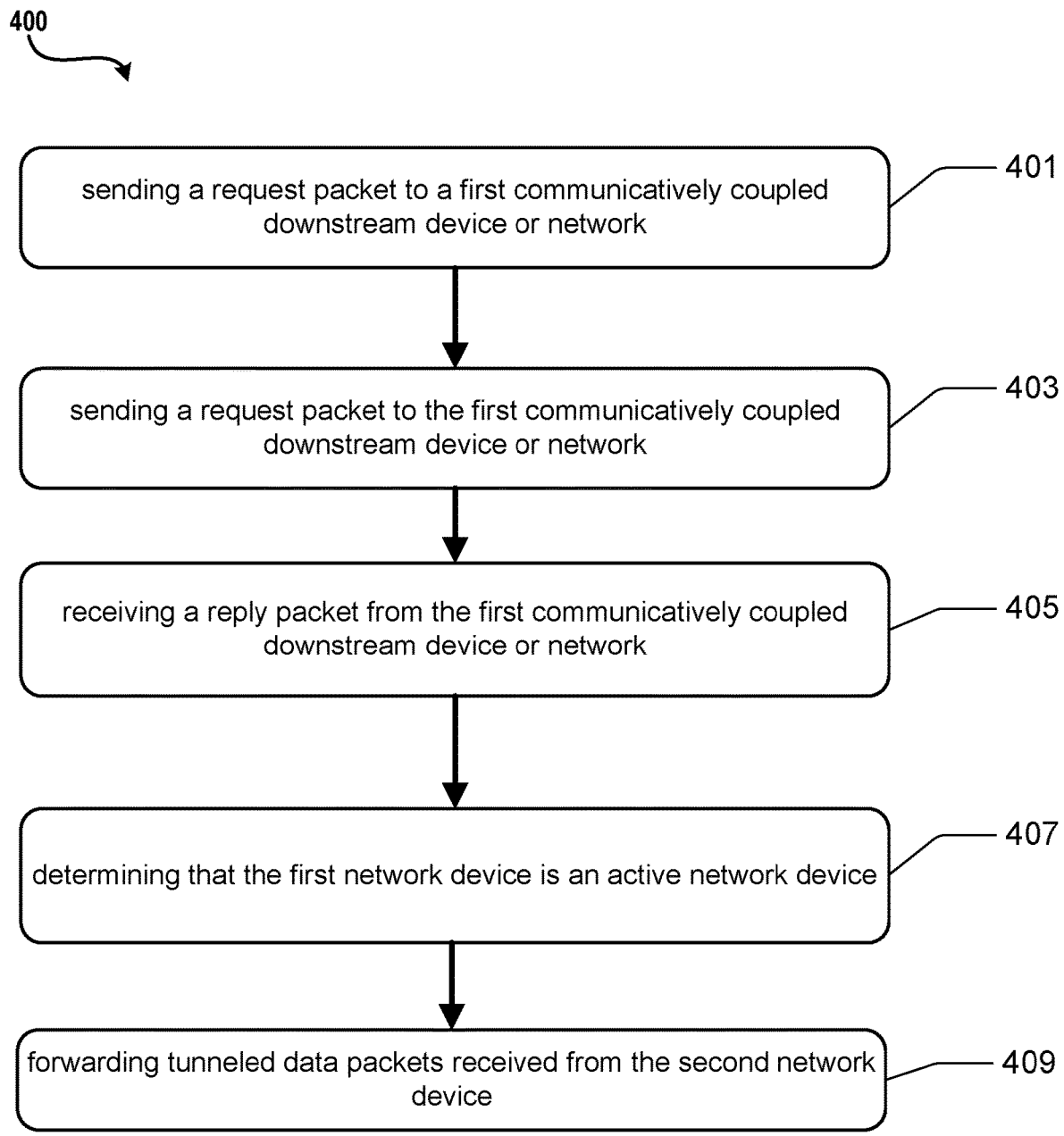
FIG. 4 is a flowchart depicting an example procedure in accordance with the present disclosure.

Turning now to FIG. 4, illustrated is an example operational procedure for routing data in accordance with the present disclosure. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

The operational procedure may be implemented in a network comprising at least two network devices and a plurality of downstream devices or networks. The downstream devices or networks may be communicatively coupled to network interfaces of the network devices using a plurality of data cables. The data cables may comprise a switch device configured to switch communication paths to the coupled network devices The data cables may communicatively couple each of the network devices to one of the plurality of downstream devices or networks so that each of the downstream devices or networks has a communications path to each of the network devices and a switchable communications path from each of the network devices. In an embodiment, the network devices do not arbitrate active/passive status via direct communication. Referring to FIG. 4, operation 401 illustrates sending, by a first of the network devices, a request packet to a first communicatively coupled downstream device or network. In an embodiment, the request packet is sent by a communication path corresponding to a first of the data cables connecting a first of the network interfaces to the first communicatively coupled downstream device or network.

Operation 401 may be followed by operation 403. Operation 403 illustrates sending, by a second of the network devices, a request packet to the first communicatively coupled downstream device or network.

Operation 403 may be followed by operation 405. Operation 405 illustrates receiving, by the first and second network devices, a reply packet from the first communicatively coupled downstream device or network. In an embodiment, the reply packet is generated based on the request packet sent by the first network device based on the first data cable connecting the first network interface to the first communicatively coupled downstream device or network.

Operation 405 may be followed by operation 407. Operation 407 illustrates based on data contained in the reply packet indicating that the request packet sent by the first network device was acknowledged, determining, by the first network device, that the first network device is an active network device. In an embodiment, the determining is performed independently of communication with the second network device.

Operation 407 may be followed by operation 409. Operation 409 illustrates based on its status as the active network device, forwarding, by the first network device to the first communicatively coupled downstream device or network, tunneled data packets received from the second network device.

In an embodiment, the method further comprises disabling ACLs that block upstream data packets.

In an embodiment, the method further comprises:
sending, by the first and second network devices, a second request packet;
receiving, by the first communicatively coupled downstream device or network, only the request packet sent by the second network device based on the first data cable connecting the second network interface to the first communicatively coupled downstream device or network;
receiving, by the first and second network devices, a second reply packet from the first communicatively coupled downstream device or network, wherein the second reply packet is generated based on the request packet sent by the second network device;
based on data contained in the second reply packet, determining, by the first and second network devices, that the second network device is an active network device; and
based on its status as the active network device, forwarding, by the second network device to the first communicatively coupled downstream device or network, tunneled data packets received from the first network device.

In an embodiment, the request and reply packets are ICMP ECHO packets.

In an embodiment, the request and reply packets are BGP packets.

In an embodiment, the determining that the first network device is an active top-of-rack switch is based on the reply packet specifying the first network device as a destination address for the reply packet.

In an embodiment, the method further comprises decapsulating the tunneled data packets.

In an embodiment, the method further comprises:
receiving, by the second network device, a data packet addressed to the first communicatively coupled downstream device or network;
encapsulating, by the second network device, the data packet addressed to the first communicatively coupled downstream device or network; and
forwarding, by the second network device, the encapsulated data packet to the first network device.

In an embodiment, the method further comprises:

receiving, by the first network device, an encapsulated data packet;

decapsulating, by the first network device, the encapsulated data packet; and forwarding, by the first network device, the decapsulated data packet to the first communicatively coupled downstream device or network.

In an embodiment, the method further comprises creating an ACL to block upstream traffic from the first network device.

Figure 5:
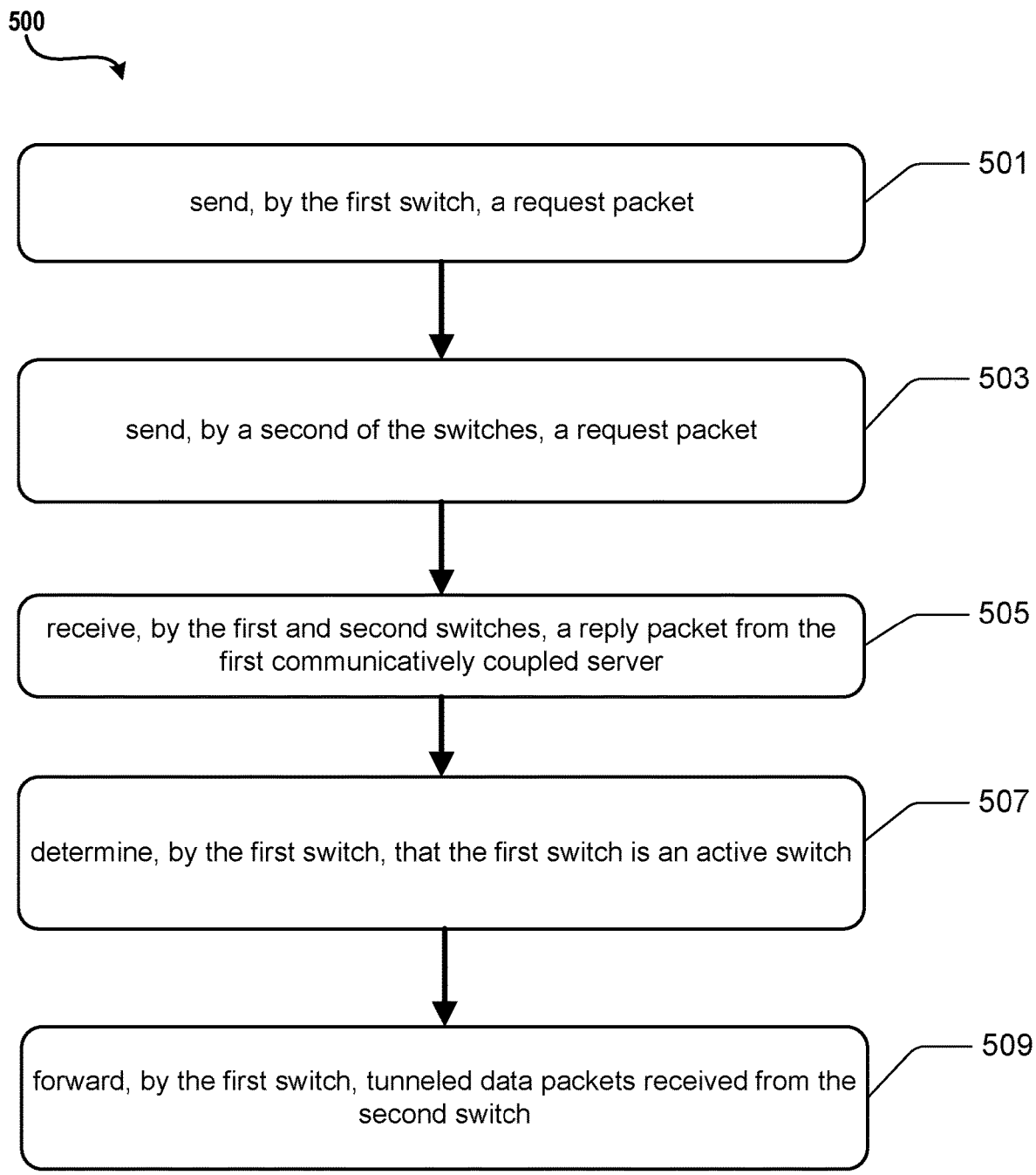
FIG. 5 is a flowchart depicting an example procedure in accordance with the present disclosure.

Turning now to FIG. 5, illustrated is an example operational procedure for routing data in accordance with the present disclosure. The operational procedure may be implemented in a system comprising plurality of servers and at least two switches. A plurality of data cables may each have a switching device. The servers may be communicatively coupled to network interfaces of the switches using the plurality of data cables. The switch devices may be configured to switch communication paths between the switches. Each of the data cables may be communicatively couple the switches to one of the plurality of servers. In an embodiment, the switch device of a first data cable connects a first network interface to a first communicatively coupled server when the communication path from a first of the switches to a first of the communicatively coupled servers is determined to be valid. The communication path corresponding to a first of the data cables may connect a first network interface to the first communicatively coupled server.

Referring to FIG. 5, operation 501 illustrates send, by the first switch, a request packet.

Operation 501 may be followed by operation 503. Operation 503 illustrates send, by a second of the switches, a request packet.

Operation 503 may be followed by operation 505. Operation 505 illustrates receive, by the first and second switches, a reply packet from the first communicatively coupled server. In an embodiment, the reply packet is generated based on the request packet sent by the first switch based on the first data cable connecting the first network interface to the first communicatively coupled server.

Operation 505 may be followed by operation 507. Operation 507 illustrates based on data contained in the reply packet indicating that the request packet sent by the first switch was acknowledged, determine, by the first switch, that the first switch is an active switch.

Operation 507 may be followed by operation 509. Operation 509 illustrates based on its status as the active switch, forward, by the first switch to the first communicatively coupled server, tunneled data packets received from the second switch.

In an embodiment, the switches are further configured to:
in response to detecting a failure of the communication path from the first switch, cause the switch device of the first data cable to connect a second network interface to the first communicatively coupled server, the second network interface providing a communication path from the second of switches to the first communicatively coupled server;

send, by the first and second switches, a second request packet;

receive, by the first communicatively coupled server, only the request packet sent by the second switch based on the first data cable connecting the second network interface to the first communicatively coupled server;

receive, by the first and second switches, a second reply packet from the first communicatively coupled server, wherein the second reply packet is generated based on the request packet sent by the second switch;

based on data contained in the second reply packet, determine, by the first and second switches, that the second switch is an active switch; and based on its status as the active switch, forward, by the second switch to the first communicatively coupled server, tunneled data packets received from the first switch.

In an embodiment, the request and reply packets are ICMP ECHO packets, ARPing packets, or BGP packets.

Figure 6:
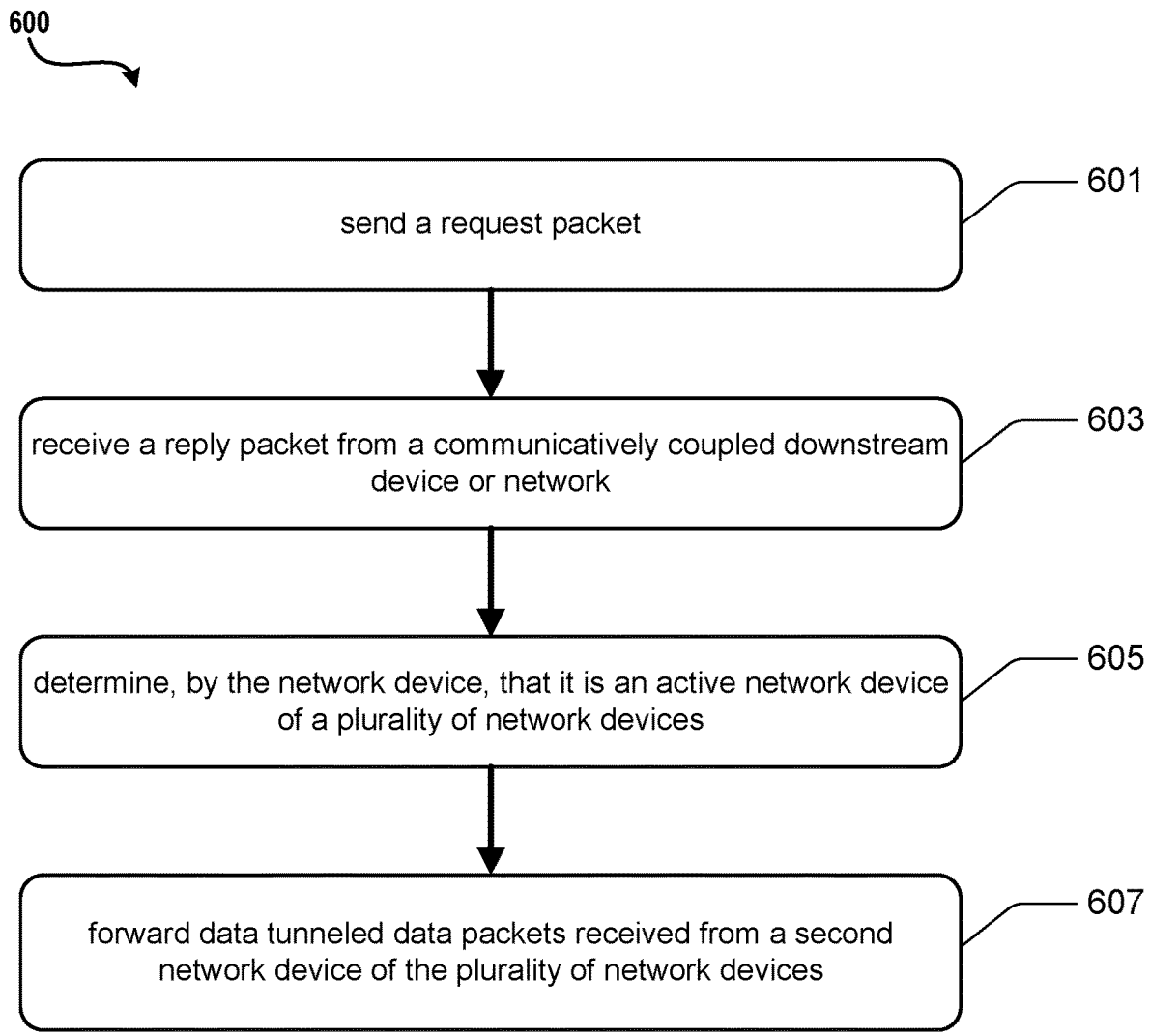
FIG. 6 is a flowchart depicting an example procedure in accordance with the present disclosure.
Figure 7:
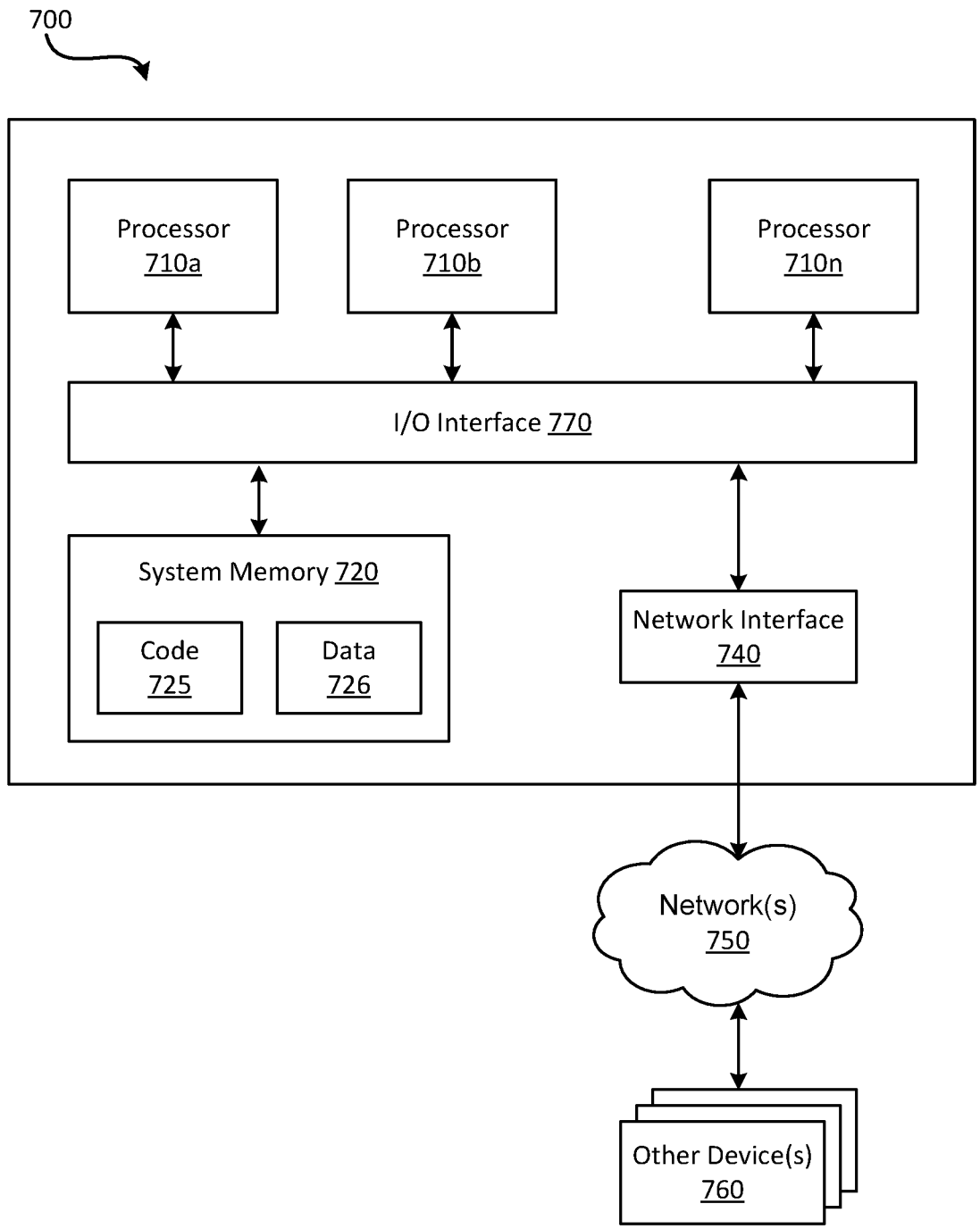
FIG. 7 is an example computing device in accordance with the present disclosure.

Turning now to FIG. 6, illustrated is an example operational procedure for routing data in accordance with the present disclosure. The operational procedure may be implemented by a network device where network interfaces of the network device are communicatively coupled to a downstream device or network using a data cable comprising a switch device configured to switch communication paths to the network device. The data cable may communicatively couple the network device to the downstream device or network so that the downstream device or network has a switchable communications path to the network device and a second network device. In an embodiment, the network device and the second network device do not arbitrate active/passive status via direct communication. Referring to FIG. 6, operation 601 illustrates send a request packet.

Operation 601 may be followed by operation 603. Operation 603 illustrates receive a reply packet from a communicatively coupled downstream device or network. In an embodiment, the reply packet is generated based on the request packet sent by the network device based on the data cable connecting the network device to the communicatively coupled downstream device or network.

Operation 603 may be followed by operation 605. Operation 605 illustrates based on data contained in the reply packet indicating that the request packet sent by the network device was acknowledged, determine, by the network device, that it is an active network device of a plurality of network devices.

Operation 605 may be followed by operation 607. Operation 607 illustrates based on its status as the active network device, forward, to the first communicatively coupled downstream device or network, tunneled data packets received from a second network device of the plurality of network devices.

In an embodiment, a plurality of downstream devices or networks are communicatively coupled to network interfaces of the plurality of network devices using a plurality of data cables, the data cables each comprising a switch device configured to switch communication paths to the coupled network devices, each of the data cables communicatively coupling each of the network devices to one of the plurality of downstream devices or networks so that each of the downstream devices or networks has a communications path to each of the network devices and a switchable communications path from each of the network devices.

In an embodiment, the network device is further configured to disable ACLs that block upstream data packets.

In an embodiment, determining that the network device is an active network device is based on the reply packet specifying the network device as a destination address for the reply packet.

In an embodiment, the network device is further configured to:
send a second request packet;

receive a second reply packet from the first communicatively coupled downstream device or network, wherein the second reply packet is generated based on the second request packet sent by the network device based on the data cable connecting the network device to the communicatively coupled downstream device or network; and based on data contained in the second reply packet, determine, by the network device, that it is a standby network device of a plurality of network devices.

In an embodiment, the network device is further configured to decapsulate the tunneled data packets.

In an embodiment, the e request and reply packets are ICMP ECHO packets, ARPing packets, or BGP packets.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc. A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

In some embodiments, a server that implements a portion or all of one or more of the technologies described herein, including the techniques to implement the capturing of network traffic may include a general-purpose computer system that includes or is configured to access one or more computer-accessible media. FIG. 8 illustrates such a general-purpose computing device 800. In the illustrated embodiment, computing device 800 includes one or more processors 810a, 810b, and/or 810n (which may be referred herein singularly as "a processor 810" or in the plural as "the processors 810") coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 820 as code 825 and data 826.

In one embodiment, I/O interface 880 may be configured to coordinate I/O traffic between the processor 810, system memory 820, and any peripheral devices in the device, including network interface 840 or other peripheral interfaces. In some embodiments, I/O interface 880 may perform any necessary protocol, timing, or other data transformations to convert data signals from one component (e.g., system memory 820) into a format suitable for use by another component (e.g., processor 810). In some embodiments, I/O interface 880 may include support for devices attached through various types of peripheral buses, such as a variant of the Peripheral Component Interconnect (PCI) bus standard or the Universal Serial Bus (USB) standard, for example. In some embodiments, the function of I/O interface 880 may be split into two or more separate components. Also, in some embodiments some or all of the functionality of I/O interface 880, such as an interface to system memory 820, may be incorporated directly into processor 810.

Network interface 840 may be configured to allow data to be exchanged between computing device 800 and other device or devices 860 attached to a network or network(s) 850, such as other computer systems or devices as illustrated in FIGS. 1 through 4, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 880. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1:
A method for routing data at a network comprising at least two network devices and a plurality of downstream devices or networks, the downstream devices or networks communicatively coupled to network interfaces of the network devices using a plurality of data cables, the data cables each comprising a switch device configured to switch communication paths to the coupled network devices, each of the data cables communicatively coupling each of the network devices to one of the plurality of downstream devices or networks so that each of the downstream devices or networks has a communications path to each of the network devices and a switchable communications path from each of the network devices, wherein the network devices do not arbitrate active/passive status via direct communication, the method comprising:

sending, by a first of the network devices, a request packet to a first communicatively coupled downstream device or network, wherein the request packet is sent by a communication path corresponding to a first of the data cables connecting a first of the network interfaces to the first communicatively coupled downstream device or network;

sending, by a second of the network devices, a request packet to the first communicatively coupled downstream device or network;

receiving, by the first and second network devices, a reply packet from the first communicatively coupled downstream device or network, wherein the reply packet is generated based on the request packet sent by the first network device based on the first data cable connecting the first network interface to the first communicatively coupled downstream device or network;

based on data contained in the reply packet indicating that the request packet sent by the first network device was acknowledged, determining, by the first network device, that the first network device is an active network device, wherein the determining is performed independently of communication with the second network device; and based on its status as the active network device, forwarding, by the first network device to the first communicatively coupled downstream device or network, tunneled data packets received from the second network device.

Clause 2: The method of clause 1, further comprising disabling ACLs that block upstream data packets.

Clause 3: The method of any of clauses 1-2, further comprising:

sending, by the first and second network devices, a second request packet;

receiving, by the first communicatively coupled downstream device or network, only the request packet sent by the second network device based on the first data cable connecting the second network interface to the first communicatively coupled downstream device or network;

receiving, by the first and second network devices, a second reply packet from the first communicatively coupled downstream device or network, wherein the second reply packet is generated based on the request packet sent by the second network device;

based on data contained in the second reply packet, determining, by the first and second network devices, that the second network device is an active network device; and based on its status as the active network device, forwarding, by the second network device to the first communicatively coupled downstream device or network, tunneled data packets received from the first network device.

Clause 4: The method of any of clauses 1-3, wherein the request and reply packets are ICMP ECHO packets.

Clause 5: The method of any of clauses 1-4, wherein the request and reply packets are BGP packets.

Clause 6: The method of any of clauses 1-5, wherein determining that the first network device is an active top-of-rack switch is based on the reply packet specifying the first network device as a destination address for the reply packet.

Clause 7: The method of any of clauses 1-6, further comprising decapsulating the tunneled data packets.

Clause 8: The method of any of clauses 1-7, further comprising:

receiving, by the second network device, a data packet addressed to the first communicatively coupled downstream device or network;

encapsulating, by the second network device, the data packet addressed to the first communicatively coupled downstream device or network; and forwarding, by the second network device, the encapsulated data packet to the first network device.

Clause 9: The method of any of clauses 1-8, further comprising:

receiving, by the first network device, an encapsulated data packet;

decapsulating, by the first network device, the encapsulated data packet; and forwarding, by the first network device, the decapsulated data packet to the first communicatively coupled downstream device or network.

Clause 10: The method of any of clauses 1-9, further comprising creating an ACL to block upstream traffic from the first network device.

Clause 11: A system comprising:

a plurality of servers;

at least two switches; and a plurality of data cables each having a switching device, the servers communicatively coupled to network interfaces of the switches using the plurality of data cables, the switch devices configured to switch communication paths between the switches, each of the data cables communicatively coupling the switches to one of the plurality of servers so that each of the servers has a communications path to each of the switches and a switchable communications path from each of the switches, wherein the switch device of a first data cable connects a first network interface to a first communicatively coupled server when the communication path from a first of the switches to a first of the communicatively coupled servers is determined to be valid, the communication path corresponding to a first of the data cables connecting a first network interface to the first communicatively coupled server;

the switches configured to:

send, by the first switch, a request packet;

send, by a second of the switches, a request packet;

receive, by the first and second switches, a reply packet from the first communicatively coupled server, wherein the reply packet is generated based on the request packet sent by the first switch based on the first data cable connecting the first network interface to the first communicatively coupled server;

based on data contained in the reply packet indicating that the request packet sent by the first switch was acknowledged, determine, by the first switch, that the first switch is an active switch; and based on its status as the active switch, forward, by the first switch to the first communicatively coupled server, tunneled data packets received from the second switch.

Clause 12: The system of clause 11, wherein the switches are further configured to:

in response to detecting a failure of the communication path from the first switch, cause the switch device of the first data cable to connect a second network interface to the first communicatively coupled server, the second network interface providing a communication path from the second of switches to the first communicatively coupled server;

send, by the first and second switches, a second request packet;

receive, by the first communicatively coupled server, only the request packet sent by the second switch based on the first data cable connecting the second network interface to the first communicatively coupled server;

receive, by the first and second switches, a second reply packet from the first communicatively coupled server, wherein the second reply packet is generated based on the request packet sent by the second switch;

based on data contained in the second reply packet, determine, by the first and second switches, that the second switch is an active switch; and based on its status as the active switch, forward, by the second switch to the first communicatively coupled server, tunneled data packets received from the first switch.

Clause 13: The system of any of clauses 11 and 12 wherein the request and reply packets are ICMP ECHO packets, ARPing packets, or BGP packets.

Clause 14: A network device, wherein network interfaces of the network device are communicatively coupled to a downstream device or network using a data cable comprising a switch device configured to switch communication paths to the network device, the data cable communicatively coupling the network device to the downstream device or network so that the downstream device or network has a switchable communications path to the network device and a second network device, wherein the network device and the second network device do not arbitrate active/passive status via direct communication, the network device configured to:

send a request packet;

receive a reply packet from a communicatively coupled downstream device or network, wherein the reply packet is generated based on the request packet sent by the network device based on the data cable connecting the network device to the communicatively coupled downstream device or network;

based on data contained in the reply packet indicating that the request packet sent by the network device was acknowledged, determine, by the network device, that it is an active network device of a plurality of network devices; and based on its status as the active network device, forward, to the first communicatively coupled downstream device or network, tunneled data packets received from a second network device of the plurality of network devices.

Clause 15: The network device of clause 14, wherein a plurality of downstream devices or networks are communicatively coupled to network interfaces of the plurality of network devices using a plurality of data cables, the data cables each comprising a switch device configured to switch communication paths to the coupled network devices, each of the data cables communicatively coupling each of the network devices to one of the plurality of downstream devices or networks so that each of the downstream devices or networks has a communications path to each of the network devices and a switchable communications path from each of the network devices.

Clause 16: The network device of any of clauses 14 and 15, wherein the network device is further configured to disable ACLs that block upstream data packets.

Clause 17: The network device of any of the clauses 14-16, wherein determining that the network device is an active network device is based on the reply packet specifying the network device as a destination address for the reply packet.

Clause 18: The network device of any of the clauses 14-17, further configured to:

send a second request packet;

receive a second reply packet from the first communicatively coupled downstream device or network, wherein the second reply packet is generated based on the second request packet sent by the network device based on the data cable connecting the network device to the communicatively coupled downstream device or network; and based on data contained in the second reply packet, determine, by the network device, that it is a standby network device of a plurality of network devices.

Clause 19: The network device of any of the clauses 14-18, wherein the network device is further configured to decapsulate the tunneled data packets.

Clause 20: The network device of any of the clauses 14-19, wherein the request and reply packets are ICMP ECHO packets, ARPing packets, or BGP packets.

The invention claimed is:

1. A method for routing data at a network comprising at least two network devices and a plurality of downstream devices or networks, the downstream devices or networks communicatively coupled to network interfaces of the network devices using a plurality of data cables, the data cables each comprising a switch device configured to switch communication paths to the coupled network devices, each of the data cables communicatively coupling each of the network devices to one of the plurality of downstream devices or networks so that each of the downstream devices or networks has a communications path to each of the network devices and a switchable communications path from each of the network devices, wherein the network devices do not arbitrate active/passive status via direct communication, the method comprising:

sending, by a first of the network devices, a request packet to a first communicatively coupled downstream device or network, wherein the request packet is in accordance with a network protocol and is sent by a communication path corresponding to a first of the data cables connecting a first of the network interfaces to the first communicatively coupled downstream device or network;

sending, by a second of the network devices, a request packet in accordance with the network protocol to the first communicatively coupled downstream device or network;

receiving, by the first and second network devices, a reply packet from the first communicatively coupled downstream device or network, wherein the reply packet is generated in accordance with the network protocol in response to the request packet sent by the first network device based on the first data cable connecting the first network interface to the first communicatively coupled downstream device or network;

based on data contained in the reply packet indicating that the request packet sent by the first network device was acknowledged in accordance with the network protocol, determining, by the first network device, that the first network device is an active network device, wherein the determining is performed independently of communication with the second network device that is not in accordance with the network protocol; and based on its status as the active network device, forwarding, by the first network device to the first communicatively coupled downstream device or network, tunneled data packets received from the second network device.

2. The method of claim 1, further comprising disabling access control lists (ACLs) that block upstream data packets.

3. The method of claim 1, further comprising:
sending, by the first and second network devices, a second request packet;

receiving, by the first communicatively coupled downstream device or network, only the request packet sent by the second network device based on the first data cable connecting the second network interface to the first communicatively coupled downstream device or network;

receiving, by the first and second network devices, a second reply packet from the first communicatively coupled downstream device or network, wherein the second reply packet is generated based on the request packet sent by the second network device;

based on data contained in the second reply packet, determining, by the first and second network devices, that the second network device is an active network device; and based on its status as the active network device, forwarding, by the second network device to the first communicatively coupled downstream device or network, tunneled data packets received from the first network device.

4. The method of claim 1, wherein the request and reply packets are Internet Control Message Protocol (ICMP) ECHO packets.

5. The method of claim 1, wherein the request and reply packets are Border Gateway Protocol (BGP) packets.

6. The method of claim 1, wherein determining that the first network device is an active top-of-rack switch is based on the reply packet specifying the first network device as a destination address for the reply packet.

7. The method of claim 1, further comprising decapsulating the tunneled data packets.

8. The method of claim 1, further comprising:
receiving, by the second network device, a data packet addressed to the first communicatively coupled downstream device or network;
encapsulating, by the second network device, the data packet addressed to the first communicatively coupled downstream device or network; and
forwarding, by the second network device, the encapsulated data packet to the first network device.

9. The method of claim 3, further comprising:
receiving, by the first network device, an encapsulated data packet;
decapsulating, by the first network device, the encapsulated data packet; and
forwarding, by the first network device, the decapsulated data packet to the first communicatively coupled downstream device or network.

10. The method of claim 8, further comprising creating an access control list (ACL) to block upstream traffic from the first network device.

11. A system comprising:
a plurality of servers;
at least two switches; and
a plurality of data cables each having a switching device, the servers communicatively coupled to network interfaces of the switches using the plurality of data cables, the switch devices configured to switch communication paths between the switches, each of the data cables communicatively coupling the switches to one of the plurality of servers so that each of the servers has a communications path to each of the switches and a switchable communications path from each of the switches,
wherein the switch device of a first data cable connects a first network interface to a first communicatively coupled server when the communication path from a first of the switches to a first of the communicatively coupled servers is determined to be valid, the communication path corresponding to a first of the data cables connecting a first network interface to the first communicatively coupled server;

the switches configured to:

send, by the first switch, a request packet is in accordance with a network protocol;

send, by a second of the switches, a request packet in accordance with the network protocol;

receive, by the first and second switches, a reply packet from the first communicatively coupled server, wherein the reply packet is generated in accordance with the network protocol in response to the request packet sent by the first switch based on the first data cable connecting the first network interface to the first communicatively coupled server;

based on data contained in the reply packet indicating that the request packet sent by the first switch was acknowledged in accordance with the network protocol, determine, by the first switch, that the first switch is an active switch; and based on its status as the active switch, forward, by the first switch to the first communicatively coupled server, tunneled data packets received from the second switch.

12. The system of claim 11 wherein the switches are further configured to:

in response to detecting a failure of the communication path from the first switch, cause the switch device of the first data cable to connect a second network interface to the first communicatively coupled server, the second network interface providing a communication path from the second of switches to the first communicatively coupled server;

send, by the first and second switches, a second request packet;

receive, by the first communicatively coupled server, only the request packet sent by the second switch based on the first data cable connecting the second network interface to the first communicatively coupled server;

receive, by the first and second switches, a second reply packet from the first communicatively coupled server, wherein the second reply packet is generated based on the request packet sent by the second switch;

based on data contained in the second reply packet, determine, by the first and second switches, that the second switch is an active switch; and based on its status as the active switch, forward, by the second switch to the first communicatively coupled server, tunneled data packets received from the first switch.

13. The system of claim 11, wherein the request and reply packets are packets are Internet Control Message Protocol (ICMP) ECHO packets, Address Resolution Protocol ping (ARPing) packets, or Border Gateway Protocol (BGP) packets.

14. A network device, wherein network interfaces of the network device are communicatively coupled to a downstream device or network using a data cable comprising a switch device configured to switch communication paths to the network device, the data cable communicatively coupling the network device to the downstream device or network so that the downstream device or network has a switchable communications path to the network device and a second network device, wherein the network device and the second network device do not arbitrate active/passive status via direct communication, the network device configured to:

send a request packet is in accordance with a network protocol;

receive a reply packet from a communicatively coupled downstream device or network, wherein the reply packet is generated in accordance with the network protocol in response to the request packet sent by the network device based on the data cable connecting the network device to the communicatively coupled downstream device or network;

based on data contained in the reply packet indicating that the request packet sent by the network device was acknowledged in accordance with the network protocol, determine, by the network device, that it is an active network device of a plurality of network devices; and based on its status as the active network device, forward, to the communicatively coupled downstream device or network, tunneled data packets received from a second network device of the plurality of network devices.

15. The network device of claim 14, wherein a plurality of downstream devices or networks are communicatively coupled to network interfaces of the plurality of network devices using a plurality of data cables, the data cables each comprising a switch device configured to switch communication paths to the coupled network devices, each of the data cables communicatively coupling each of the network devices to one of the plurality of downstream devices or networks so that each of the downstream devices or networks has a communications path to each of the network devices and a switchable communications path from each of the network devices.

16. The network device of claim 14, wherein the network device is further configured to disable access control lists (ACLs) that block upstream data packets.

17. The network device of claim 14, wherein determining that the network device is an active network device is based on the reply packet specifying the network device as a destination address for the reply packet.

18. The network device of claim 14, further configured to:

send a second request packet;

receive a second reply packet from the communicatively coupled downstream device or network, wherein the second reply packet is generated based on the second request packet sent by the network device based on the data cable connecting the network device to the communicatively coupled downstream device or network; and based on data contained in the second reply packet, determine, by the network device, that it is a standby network device of a plurality of network devices.

19. The network device of claim 18, wherein the network device is further configured to decapsulate the tunneled data packets.

20. The network device of claim 14, wherein the request and reply packets are Internet Control Message Protocol (ICMP) ECHO packets, Address Resolution Protocol ping (ARPing) packets, or Border Gateway Protocol (BGP) packets.

* * * * *